United States Patent [19]

Jung

[11] Patent Number: 5,684,656
[45] Date of Patent: Nov. 4, 1997

[54] HEAD DRUM FOR A RECORDING/ REPRODUCTION DEVICE

[75] Inventor: Byoung-su Jung, Suwon, Rep. of Korea

[73] Assignee: Samsung Electronics Co., Ltd., Kyungki-Do, Rep. of Korea

[21] Appl. No.: 680,840

[22] Filed: Jul. 16, 1996

[30] Foreign Application Priority Data

Dec. 15, 1995 [KR] Rep. of Korea .................... 95-50694

[51] Int. Cl.⁶ .................................................. G11B 5/52
[52] U.S. Cl. .................................... 360/107; 360/108
[58] Field of Search ........................ 360/107, 84–85, 360/95

[56] References Cited

U.S. PATENT DOCUMENTS

| | | | |
|---|---|---|---|
| 4,891,726 | 1/1990 | Suwa et al. | 360/84 X |
| 5,278,715 | 1/1994 | Willmann et al. | 360/108 |
| 5,299,085 | 3/1994 | Sawai et al. | 360/108 |
| 5,321,569 | 6/1994 | Sakai | 360/107 |

*Primary Examiner*—John H. Wolff
*Attorney, Agent, or Firm*—Sughrue, Mion, Zinn, Macpeak & Seas, PLLC

[57] ABSTRACT

A head drum of a tape recorder includes a plurality of rotary transducing portions and a plurality of stationary transducing portions. The first rotary and stationary transducing portions include coils supplied with an audio signal, and the second rotary and stationary transducing portions include coils supplied with a video signal.

10 Claims, 4 Drawing Sheets

HEAD DRUM FOR A RECORDING/REPRODUCTION DEVICE

BACKGROUND OF THE INVENTION

1. Field of the Invention

The present invention relates to a head drum for a recording/reproduction device such as a tape recorder, and more particularly, to a head drum having an improved transducer for converting a magnetic signal recorded on a magnetic tape into an electrical signal or an electric signal into a magnetic signal.

2. Description of the Related Art

In general, tape recorders such as VTRs and camcorders are provided with a magnetic head for reading and writing information from and onto a magnetic tape. The magnetic head is usually tilted with respect to the magnetic tape and mounted on a rotating head drum to scan the magnetic tape at an angle.

The head drum of a typical tape recorder is schematically shown in FIGS. 1 and 2. The head drum includes a rotating drum 10, which is rotated by a drum motor 30, and a fixed drum 20 which is fixed to a base (not shown). The rotating drum 10 is press-fitted onto a shaft 1 of the drum motor 30. A bearing 24 is press-fitted between the fixed drum 20 and the shaft 1.

A magnetic head 11 is installed on the lower surface of a disk portion 10a of the rotating drum 10, and a rotary transducing portion 12 having both a video signal coil 12a and an audio signal coil 12b is fixed onto the lower surface of a boss portion 10b of the rotating drum 10. The fixed drum 20 is provided with a stationary transducing portion 22, which has both a video signal coil 22a and an audio signal coil 22b, corresponding to the coils 12a and 12b of the rotary transducing portion 12. A signal is induced across the respective coils in a known manner.

However, since the transducing portions 12 and 22 of the head drum have the video and audio signal coils 12a and 12b and video and audio signal coils 22a and 22b, respectively, the head drum cannot transduce a signal having many channels because the coils must be separated to avoid interference. Also, signal interference can deteriorate the resulting image or sound quality even with only two channels. Further, the large circumference of each transducing portion 12 and 22 makes miniaturization difficult.

SUMMARY OF THE INVENTION

Accordingly, it is an object of the present invention to provide a head drum of a tape recorder that is compact and can have many channels.

It is another object of the present invention to provide a head drum of a tape recorder which minimizes interference between a video signal and an audio signal.

To accomplish the above object, there is provided a head drum of a tape recorder including a rotating drum which is rotated by a drum motor and has a magnetic head attached thereto, a fixed drum disposed coaxially with the rotating drum, and transducing means for converting a magnetic signal into an electrical signal or an electric signal into a magnetic signal, the transducing means comprising, a plurality of rotary transducing portions having coils, said rotary transducing portions being installed at separate positions on the rotating drum, and a plurality of stationary transducing portions having coils, said stationary transducing portions being installed on the fixed drum, corresponding to said rotary transducing portions.

It is preferable that the rotary transducing portions include a first rotary transducing portion having a video signal coil and a second rotary transducing portion having an audio signal coil, and the stationary transducing portions include a first stationary transducing portion having a video signal coil and a second stationary transducing portion having an audio signal coil.

To accomplish another object, there is provided a head drum including, a drum motor-having a rotating shaft, a rotating drum having a boss press-fitted onto the shaft and an annular leg extended from the boss, first and second rotary transducing portions attached to the lower surface of the boss and the annular leg respectively, a fixed drum connected to the rotating shaft below the rotating drum and having a bushing inserted inside the annular leg of the rotating drum, and first and second stationary transducing portions attached to the upper surface of the bushing and on the fixed drum, respectively.

It is preferable that the first rotary and stationary transducing portions convert a video signal and the second rotary and stationary transducing portions convert an audio signal. It is further preferable that the annular leg is formed with an opening.

The head drum employing a plurality of rotary transducing portions and stationary transducing portions can provide a number of channels and be compact. Also, in such a device, the video signal coil and the audio signal coil are separated so that signal interference can be prevented.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
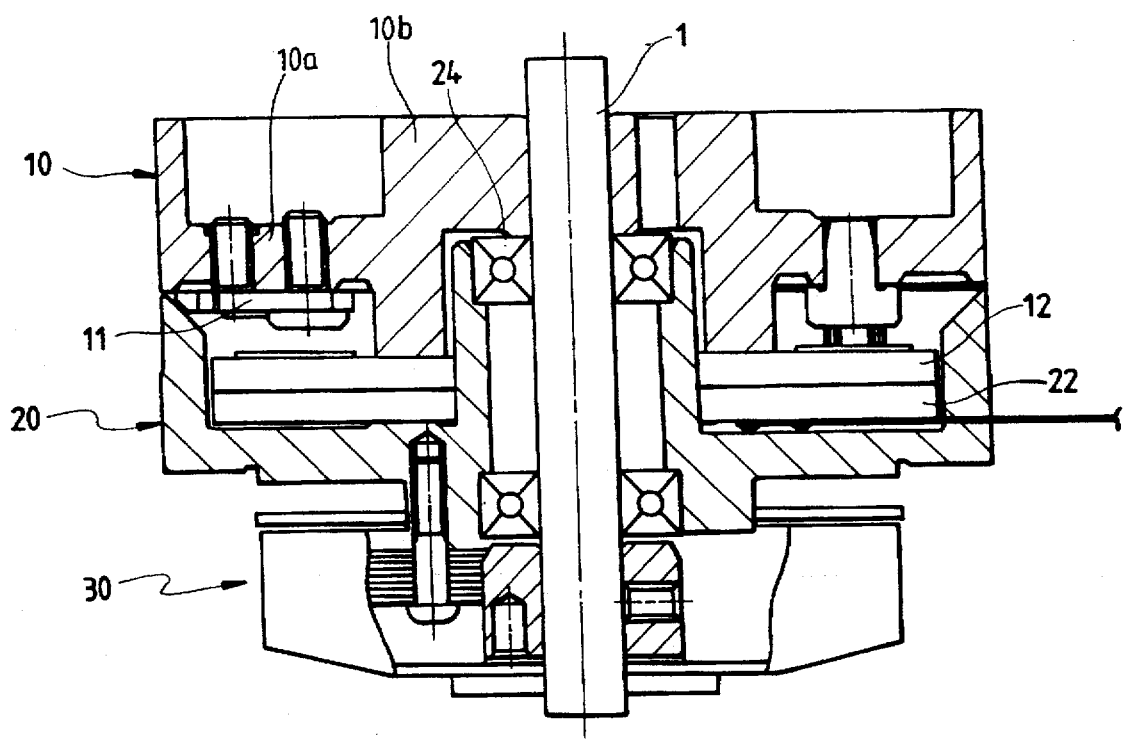
FIG. 1 is a sectional view of a conventional head drum.
Figure 2:
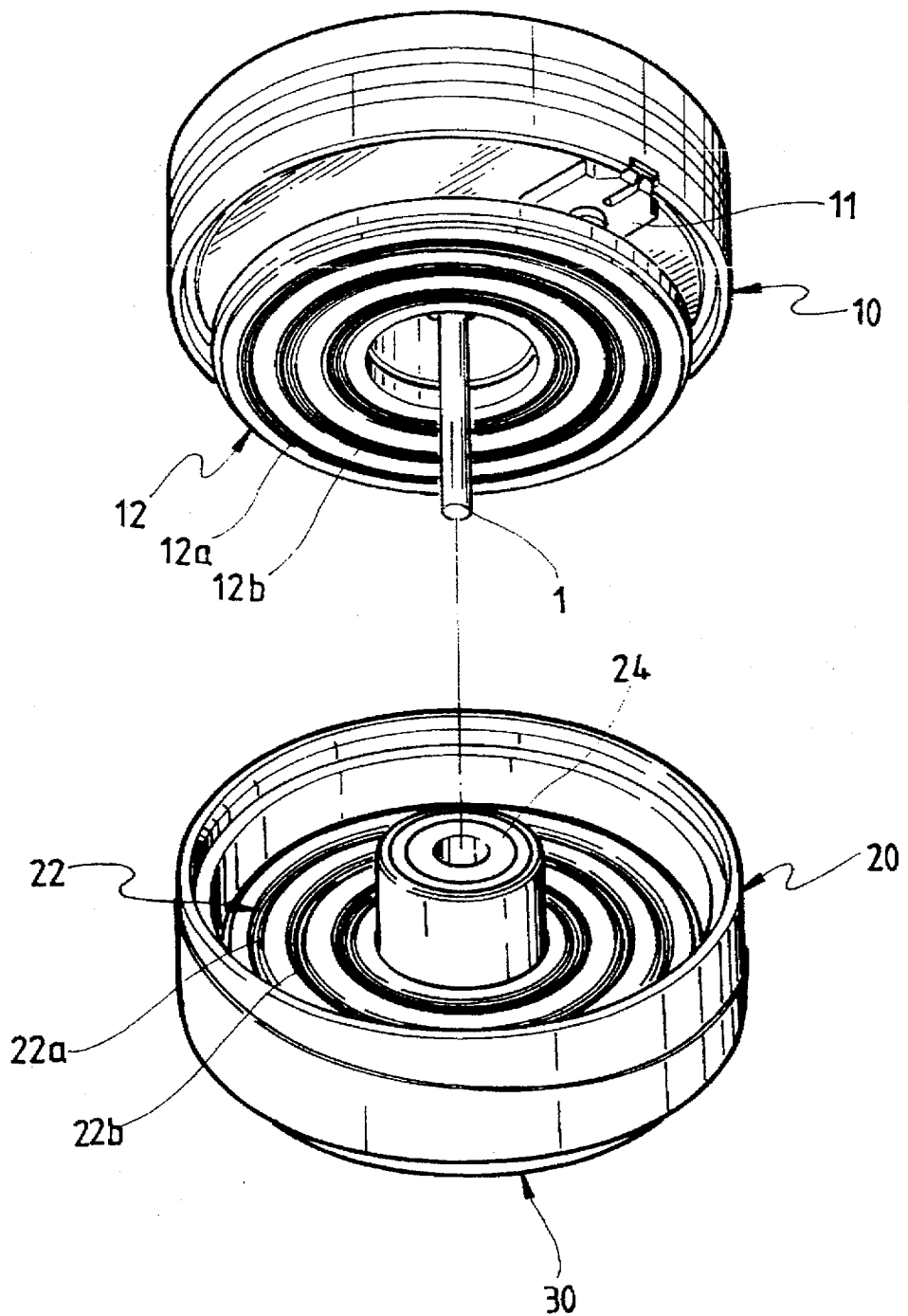
FIG. 2 is an exploded perspective view of the head drum of FIG. 1.
Figure 3:
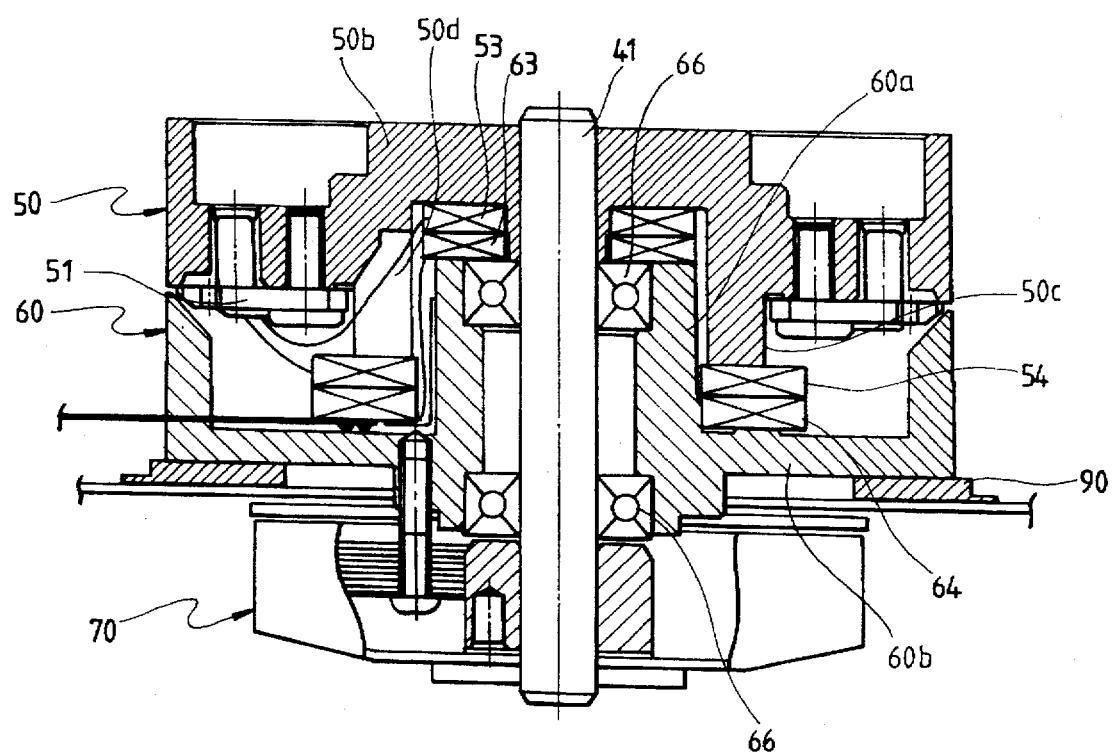
FIG. 3 is a sectional view of a head drum according to the preferred embodiment of the present invention.
Figure 4:
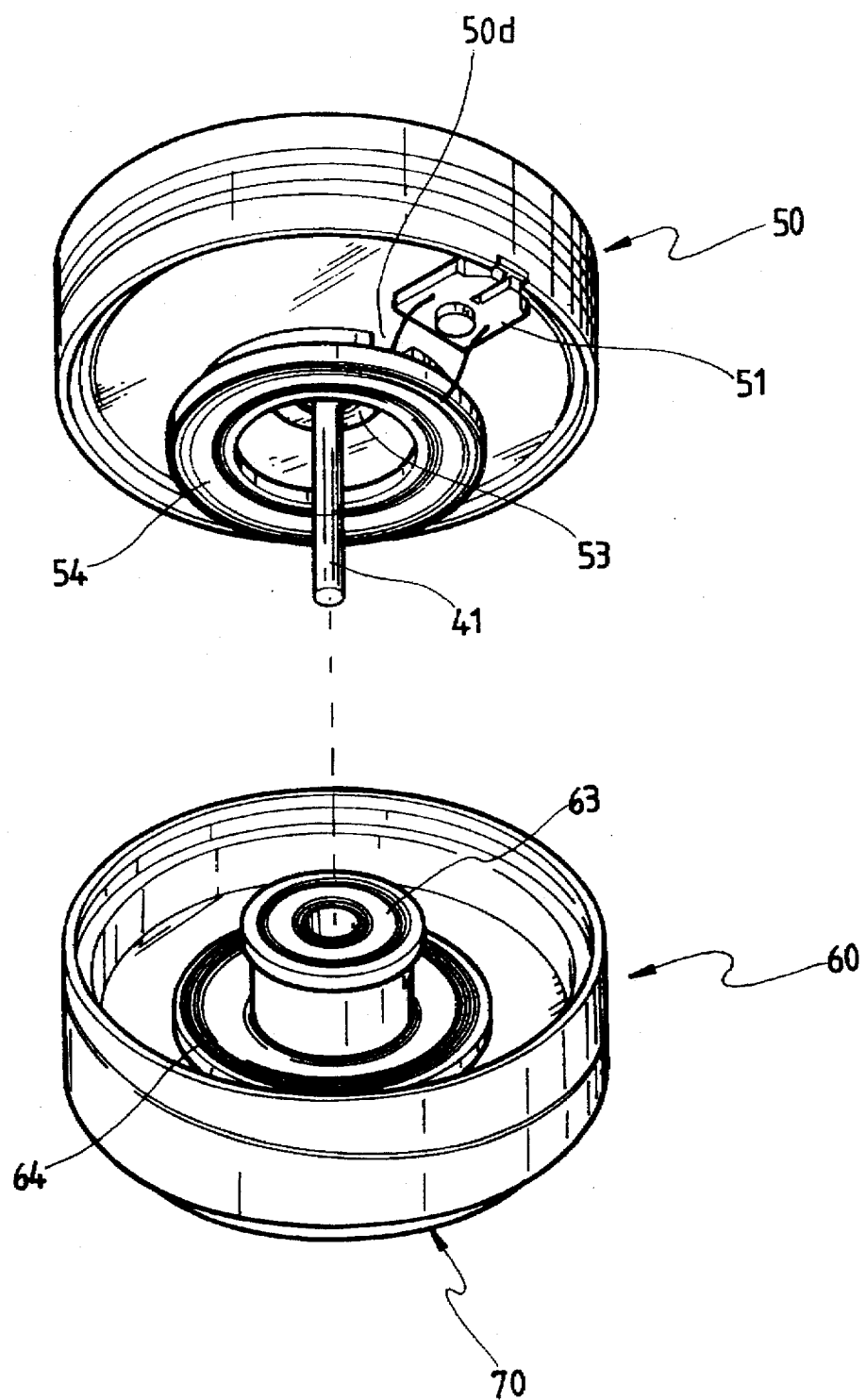
FIG. 4 is an exploded perspective view of the head drum of FIG. 3.

Referring to FIGS. 3 and 4, a head drum of a tape recorder according to the preferred embodiment of the present invention includes a rotating drum 50, having a magnetic head 51 on the lower surface thereof, press-fitted onto a shaft 41 of a drum motor 70, a fixed drum 60 disposed around the shaft 41 and fixed on a base 90, and a transducer for converting a magnetic signal into an electric signal or an electric signal into a magnetic signal. Reference numeral 66 indicates bearings which allow the shaft 41 to rotate with respect to the fixed drum 60.

The transducer includes first and second rotary transducing portions 53 and 54 respectively mounted on the lower surface of a boss 50b and an annular leg 50c extended from the boss 50b, and first and second stationary transducing portions 63 and 64 respectively mounted on the upper surfaces of a bushing 60a and a disk portion 60b of the fixed drum 60 at positions corresponding to the first and second rotary transducing portions 53 and 54.

Coils are wound inside the first and second rotary transducing portions 53 and 54, respectively, to receive or transmit a video signal and an audio signal, respectively.

Similarly, coils are wound inside the first and second stationary transducing portions 63 and 64 to receive or transmit a video signal and an audio signal, respectively. That is, the transducing portions 53 and 63 exclusively convert the audio signal and the transducing portions 54 and 64 exclusively convert the video signal. The annular leg 50c is formed with an opening 50d for allowing wires connecting the coil of the first rotary transducing portion 53 to the magnetic head to pass therethrough. Bearings 66 are press-fitted inside the bushing 60a of the fixed drum 60. The coils of the first and second rotary transducing portions 53 and 54 and the first and second stationary transducing portions 63 and 64 are wound concentrically.

Separation of the first and second rotary and stationary transducing portions is achieved in two ways. First, the first rotary transducing portion 53 is arranged in a plane that is different from that of the second rotary transducing portion 54 and the first stationary transducing portion 63 is also arranged in a plane that is different from that of the second stationary transducing portion 64. Second, the radial distance from shaft 41 of the first rotary and stationary transducing portions 53 and 63 are different from those of the second rotary and stationary transducing portions 54 and 64, respectively.

The head drum of the tape recorder according to the present invention operates as follows. As he rotating drum 50 is rotated by the drum motor 70, the first and second rotary transducing portions 53 and 54 rotate with respect to the first and second stationary transducing portions 63 and 64, which are mounted to the fixed drum 60. As information recorded on the magnetic tape is reproduced, it magnetic audio signal is converted into an electrical audio signal between the first rotary transducing portion 53 and the first stationary transducing portion 63 through known induction techniques. A magnetic video signal is converted into an electrical video signal between the second rotary transducing portion 54 and the second stationary transducing portion 64. Similarly, when information is recorded onto the magnetic tape, the electrical audio and video signals are converted into the magnetic signals through the respective transducing portions.

According to the present invention, the head drum employing the first and second rotary transducing portions 53 and 54 and the first and second stationary transducing potions 63 and 64 can have a number of channels and be miniaturized. In the first and second rotary transducing portions 53 and 54 and the first and second stationary transducing portions 63 and 64, the video signal coils and the audio signal coils are wound separately so that signal interference can be prevented. Thus, it can be expected that sound quality and screen quality will be enhanced.

The invention has been described through a preferred embodiment. However, various modifications can be made without departing from the scope of the invention as defined by the appended claims. For example, there can be any number of transducing portions disposed in different planes and at different radial positions.

What is claimed is:

1. A head drum of a tape recorder including a rotating drum which is rotated by a drum motor, said head drum having a magnetic head attached thereto, a fixed drum disposed coaxially with said rotating drum, and a transducing means for converting a magnetic signal into an electrical signal, said transducing means comprising:

a plurality of rotary transducing portions disposed on said rotating drum at separate radial positions and in different horizontal planes; and a plurality of stationary transducing portions disposed on said fixed drum at separate radial positions and in different horizontal planes, respectively corresponding to said rotary transducing portions.

2. A head drum of a tape recorder according to claim 1, wherein said rotary transducing portions have coils therein and said stationary transducing portions have coils therein.

3. A head drum of a tape recorder according to claim 1, wherein said rotary transducing portions include a first rotary transducing portion having a video signal coil and a second rotary transducing portion having an audio signal coil, and said stationary transducing portions include a first stationary transducing portion having a video signal coil and a second stationary transducing portion having an audio signal coil.

4. A head drum of a tape recorder according to clam 2, wherein each coil of said rotary and stationary transducing portions is coaxially wound.

5. A head drum of a tape recorder according to claim 3, wherein each coil of said rotary and stationary transducing portions is coaxially wound.

6. A head drum of a tape recorder comprising:

a drum motor having a rotating shaft;

a rotating drum having a boss press-fitted onto said shaft and an annular leg extending from said boss;

first and second rotary transducing portions disposed on said rotating drum at separate radial positions and in different horizontal planes, and attached to the lower surfaces of said boss and said annular leg, respectively;

a fixed drum disposed below said rotating drum and having a bushing inserted inside said annular leg of said rotating drum; and first and second stationary transducing portions attached to the upper surface of said bushing and on said fixed drum, respectively.

7. A head drum of a tape recorder according to claim 6, wherein said first rotary and stationary transducing portions convert a video signal and said second rotary and stationary transducing portions convert an audio signal.

8. A head drum of a tape recorder according to claim 7, wherein said head drum further comprises a magnetic head attached thereto, and wherein said annular leg is formed with an opening for allowing wires connecting said first rotary transducing portion to said magnetic head to pass therethrough.

9. A head drum of a tape recorder comprising:

a drum motor having a rotating shaft;

a rotating drum disposed on said shaft, said rotating drum having a first surface that lies in a first plane and a second surface that lies in a second plane;

first and second rotary transducing portions disposed on said rotating drum at separate radial positions and in different horizontal planes, by virtue of being attached to the first surface and the second surface, respectively;

a fixed drum disposed below said rotating drum and having third and fourth surfaces that lie in third and fourth planes, respectively; and first and second stationary transducing portions attached to said third and fourth surfaces, respectively.

10. A head drum of a tape recorder including a rotating drum which is rotated by a drum motor, said head drum having a magnetic head attached thereto, a fixed drum disposed coaxially with said rotating drum, and a transducing means for converting a magnetic signal into an electrical signal, said transducing means comprising:

a first rotary transducing portion having a video signal coil and a second rotary transducing portion having an audio signal coil, said first and second rotary transducing portions disposed on said rotating drum at separate radial positions and in different horizontal planes; and a first stationary transducing portion having a video signal coil and a second stationary transducing portion having an audio signal coil, said first and second stationary transducing portions disposed on said fixed drum at separate radial positions and in different horizontal planes, respectively corresponding to said first and second rotary transducing portions.

* * * * *